United States Patent [19]

Bridle et al.

[11] Patent Number: 5,865,956
[45] Date of Patent: Feb. 2, 1999

[54] PROCESS AND APPARATUS FOR THE CONVERSION OF SLUDGES

[75] Inventors: Trevor Redvers Bridle, Mt Pleasant, Australia; Stefan Skrypski-Mantele, Schenkenzell, Germany

[73] Assignee: Environmental Solutions International Ltd., Western Australia, Australia

[21] Appl. No.: 65,311

[22] Filed: Apr. 23, 1998

[30] Foreign Application Priority Data

Apr. 3, 1996 [AU] Australia .................................. PN9102

[51] Int. Cl.⁶ ........................................................ C10B 1/02
[52] U.S. Cl. ........................ 202/117; 202/118; 202/185.1; 202/209; 202/96; 196/98; 201/2.5; 201/25; 585/240; 208/13; 208/186; 208/187
[58] Field of Search ......................................... 202/117, 118, 202/185.1, 209, 96; 196/98; 201/2.5, 25; 585/240; 208/13, 186, 187

[56] References Cited

U.S. PATENT DOCUMENTS

| | | |
|---|---|---|
| 4,618,735 | 10/1986 | Bridle et al. . |
| 4,652,686 | 3/1987 | Coenen et al. ........................... 585/240 |
| 4,781,796 | 11/1988 | Bridle et al. . |
| 4,990,237 | 2/1991 | Heuer et al. ............................... 208/13 |
| 5,114,541 | 5/1992 | Bayer . |
| 5,269,906 | 12/1993 | Reynolds et al. ........................ 208/13 |
| 5,466,383 | 11/1995 | Lee . |
| 5,589,599 | 12/1996 | McMullen et al. ...................... 585/240 |

FOREIGN PATENT DOCUMENTS

| | | |
|---|---|---|
| 0 140 811 | 5/1985 | European Pat. Off. . |
| 0 373 577 | 6/1990 | European Pat. Off. . |
| WO 85/02606 | 6/1985 | WIPO . |

*Primary Examiner*—Bekir L. Yildirim
*Attorney, Agent, or Firm*—Holland & Hart LLP

[57] ABSTRACT

A process for the conversion of organic sludges, the process comprising the steps of:

(a) feeding dried sludge through a first reactor (16);

(b) heating the dried sludge in the first reactor (16) in the absence of oxygen for the volatilization of oil producing organic materials therein, resulting in gaseous products and sludge residue (char);

(c) condensing oil from the gaseous products of the first reactor (16) in a condenser system (20);

(d) reinjecting water free oil and/or non-condensable products, if any, into a second reactor (24);

(e) transferring the sludge residue (char) from the first reactor (16) to the second reactor (24);

(f) contacting the heated sludge residue from step (b) in the second reactor (24) with the oil and/or any non-condensable products of steps (c) and (d) in the absence of oxygen to allow the generation of clean products and a high quality oil product; and (g) removing the gaseous products from the second reactor (24).

5 Claims, 1 Drawing Sheet

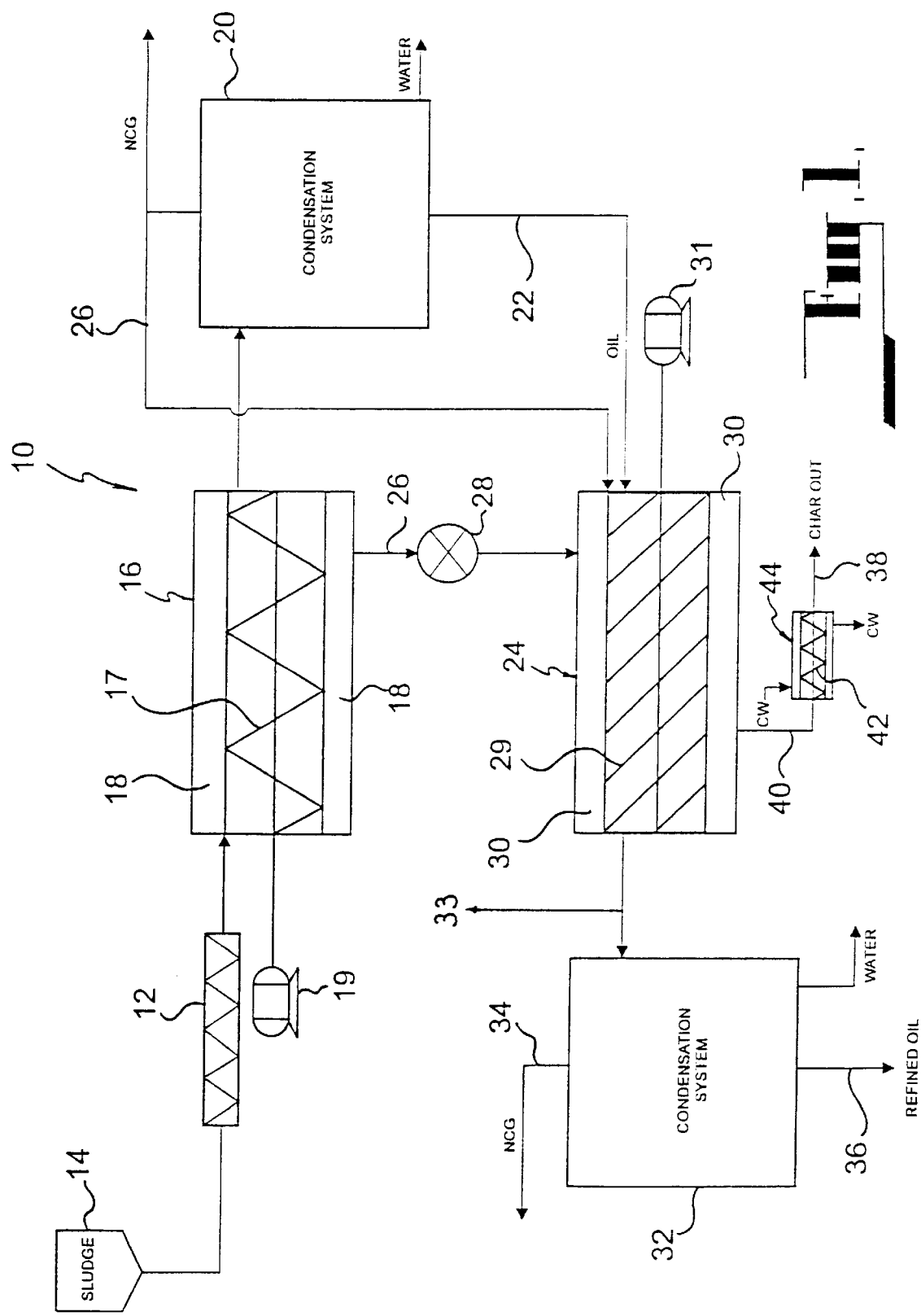

PROCESS AND APPARATUS FOR THE CONVERSION OF SLUDGES

The present invention relates to a process and apparatus for the conversion of sludges to obtain useful products therefrom, including liquid fuels. More particularly, the process and apparatus of the present invention provides an improvement to the oil product from the conversion of the organic components of sludges.

Further, the viscosity of the oil product resulting from the conversion of sludges by the process and apparatus of the present invention is intended to be used as an indicator of both organochlorine destruction and the completeness of the process.

Sewage sludge is an unavoidable by-product of the treatment of sewage and other wastewaters. Traditionally, disposal of such sludge is expensive and typically constitutes up to half of the total annual costs of wastewater treatment. Historically, the major sludge disposal options have included agricultural utilisation, land-filling and incineration. Also historically, waste water treatment plants have been designed to minimise sludge production and most effort is taken to stabilise and reduce the sludge volume prior to disposal or utilisation.

The solids component of sewage sludge comprises a mixture of organic materials composed mostly of crude proteins, lipids and carbohydrates. These solids further comprise inorganic materials such as silt, grit, clay and lower levels of heavy metals. For example, a typical raw sewage sludge comprises approximately 50 to 80% volatile material and 25 to 40% organic carbon. Some organic sludges already exceed current land application standards and consequently cannot be used agriculturally or are classified hazardous waste, largely due to their organochlorine content.

Many sludge processing options have been proposed in the past. Such options have the potential to convert a fraction of the organic material into useable energy and even less have been demonstrated as viable net energy producers at full scale. One common process involves anaerobic digestion of sewage scale. One common process involves anaerobic digestion of sewage sludge in which approximately 25% of available organic materials are converted to produce a gas rich in methane. Historically, other alternatives have included starved air incineration, gasification and liquefaction.

A significant problem associated with the above processes relates to the fact that the principle useable energy-containing products are gases which are generally not easily condensable and are of low net energy content. Accordingly, such gases are impossible or uneconomic to store and must generally be used immediately. Further, it is generally only practicable to use them to produce relatively low grade energy, such as steam and flare them to waste during periods of little or no demand. Not surprisingly, it is preferable that any process used result in storable (liquid or liquefiable), transportable and if possible, upgradable energy-containing products. Such products would include synthetic oils. It is consequently desirable that there be optimum production of net storable energy having any non-storable products, if used at all, used in the operation of the process itself.

Disposal of sewage sludge has become more problematic recently due to the fact that a) agricultural use of sewage sludge is restricted by its pollutant content, particularly the organochlorine content, and within this group the dioxins have become the limiting factor, b) ocean disposal is banned, c) land filling will be banned in the European Union by the Year 2000 and d) incineration of sewage sludge is opposed by the public primarily with respect to the dioxin issue (reformation of dioxin during hot flue gas cooling). Consequently recent research work on thermal sludge disposal processes concentrates on control of organochlorines across the process.

In the field of low temperature conversion of organic sludges, the working group of Prof. Dr. E. Bayer, University of Tubingen, Germany and the working group of Prof. Dr.-Ing. P. A. Wilderer, Technical University of Munich, Germany have conducted work directed to the destruction of organochlorines. The University of Tubingen uses a batch reactor system and achieves destruction and removal efficiencies (DRE's) for dioxins and other organochlorines in excess of 95% percent [Bayer, E, Kutubuddin, M, "Dioxinabbau bei der Niedertemperaturkonvertierung von Klarschlamm", Environment 94, Yearbook for Environmental Technology and Ecological Modernisation]. The University of Munich works with a continuous bench scale reactor (2.6 kg/hr), however they only achieve DRE's of more than 90% when passing the vapours after the reactor over a catalytic bed (Steger, M, "Fate of Chlorinated Organic Compounds during Thermal Conversion of Sewage Sludge", Wat. Sci. Tech. 26, 2261–2264, 1990). Without a catalytic bed, the toxicity equivalents (TEQs) for dioxins across the reactor are actually increased or only slightly reduced compared to the TEQs of the sludge.

In U.S. Pat. Nos. 4,618,735 and 4,781,796, the contents of which are incorporated herein by reference, there is provided a process and apparatus for the conversion of sludges by heating and chemical reaction in order to obtain useful storable products therefrom, including oils. The process described in these U.S. patents comprises the steps of heating dried sludge in a heating zone in the absence of oxygen to a temperature of at least 250° C. for the volatilisation of oil producing organic materials therein, resulting in heating zone gaseous products and sludge residue; removing the said gaseous product from the heating zone; thereafter contacting heated sludge residue in a reaction zone with the removed heating zone gaseous products in the absence of oxygen at a temperature of from 280° C. to 600° C. for repeated intimate gas/solid contact at temperatures sufficient to cause gas/solid contact, oil producing reactions to occur within the heating zone, gaseous products catalysed by the heated sludge residue resulting in reaction zone gaseous products containing condensable oil products; removing the reaction zone gaseous products from the reaction zone and separating at least the condensable oil products therefrom.

Also disclosed is an apparatus for the conversion of sludge, said apparatus comprising an enclosure establishing a heated heating zone having an inlet thereto for dried sewage sludge and separate outlets therefrom for heating zone gaseous products and residual heating zone solid products; conveyor means within the heating zone enclosure for conveying solid products from its inlet to its solid products outlet; an enclosure establishing a heated reaction zone having separate inlets thereto for gaseous and solid products and separate outlets therefrom for gaseous and solid products; conveyor means within the reaction zone enclosure for conveying solid products from its solid products inlet to its solid products outlet; a heating zone solid products outlet being connected to the reaction zone solid products inlet for the passage of solid products between them; and duct means connecting the heating zone gaseous products outlet to the reaction zone gaseous products inlet.

The above U.S. patents still further disclose a process for the optimisation of the production of oil products from the treatment of sludge including the steps of heating dried sludge residue and the volatiles obtained from the sludge in the reaction zone in the absence of oxygen to a temperature of between 280° C. and 600° C. for the establishment of catalysed vapour phase, oil-producing reactions of vaporised sludge components in the presence of the solid sludge residue catalyst components; testing samples of the sewage sludge by differential scanning calorimetry and producing as a result of the test a thermogram indicating the temperature range of the exothermic reaction characterised by the production of oil products by the process; determining from the thermogram the optimum temperature for the maximum yield of oil products from the exothermic reaction; and adjusting the average temperature of the reaction zone to be equal to the thus determined optimum temperature for oil products production. It was further envisaged that an optimisation process for continuous operation with a sludge of variable components may include the further steps of testing the sludge at intervals of time and adjusting the average temperature of the reaction, the said intervals of time being frequent enough to maintain the average temperature at or close to the optimum temperature for the variable composition sludge.

The process and apparatus for the conversion of sludges of the present invention has as one object thereof to provide a modified and new process and changes to the apparatus for the conversion of organic sludges as disclosed in U.S. Pat. Nos. 4,618,735 and 4,781,796 so as to obtain storable products with generally unrestricted use therefrom.

It is a further object of the process and apparatus of the present invention to destroy at least in part ubiquitous, anthropogenic organochlorine pollutants including AOX's, DDT, PCB's and Dioxins present in organic sludges.

It is a still further object of the present invention to provide a method for the testing and control of the process of the present invention to provide optimum organochlorine destruction and oil quality.

In accordance with the present invention there is provided a process for the conversion of organic sludges, the process comprising the steps of:

(a) feeding dried sludge through a first reactor;

(b) heating the dried sludge in the first reactor in the absence of oxygen for the volatilisation of oil producing organic materials therein, resulting in gaseous products and sludge residue (char);

(c) condensing oil from the gaseous products of the first reactor in a condenser system;

(d) reinjecting water free oil and/or non-condensable products into a second reactor;

(e) transferring the sludge residue (char) from the first reactor to the second reactor;

(f) contacting the heated sludge residue from step (b) in the second reactor with the oil and/or non-condensable products of steps (c) and (d) in the absence of oxygen to allow the generation of clean products and a high quality oil product; and (g) removing the gaseous products from the second reactor.

Preferably, the feeding of dried sludge through the first reactor utilises a feed system that ensures both no air ingress into, and no escape of gaseous products from, the first reactor. The heating of the sludge in the first reactor is preferably conducted at a temperature of at least 250° C.

The condenser system of step (c) may preferably comprise either a direct or indirect condenser, the condensation of gaseous products of step (b) taking place at $\leq 100°$ C. or $\geq 100°$ C., respectively.

Still preferably, the contact of sludge residue with the product of steps (c) and (d) occurs at a temperature of up to 550° C. so as to promote reductive, heterogenic, catalytic gas/solid phase reactions. The process may preferably further comprise the additional steps of:

(h) condensing and oil/water separating the gaseous products of the second reactor in a condensing system;

(i) removing solid products from the second reactor.

The process of the present invention may preferably still further comprise the step of measuring the viscosity of the oil product of step (h) such that process conditions may be modified as a result thereof, thereby optimising the conversion of the organic sludge, particularly the destruction rate of organochlorines.

The condensing system of step (h) may be either a direct or indirect condensing system.

The solid products removed from the second reactor in step (i) may be used as a fuel for drying the sludge in step (b) and as an absorbent. Still further, the solid product may be activated to increase adsorption properties for heavy metals.

In accordance with the present invention there is further provided an apparatus for the conversion of organic sludges, the apparatus comprising a feed system for dried sludge to be conveyed, a first reactor, a second reactor, a condenser system and an oil/water separation system, the first reactor having a transfer line provided for transfer of gaseous product to the condenser system and/or oil/water separation system, the condenser system and/or oil/water separation system having a transfer line provided for reinjection of oil or oil and non-condensable products into the second reactor, the second reactor being adapted to contact the heated sludge residue from the first reactor with the oil or oil and noncondensable products of the condenser system and/or oil/water separation system, wherein gaseous products may be removed from the second reactor.

The present invention still further provides a process for the optimisation of the process for the conversion of organic sludges as set out above with particular relevance to organochlorine destruction through use of the viscosity of the oil product as a process indicator. Preferably, the lower the viscosity of the oil product the greater the destruction rate of organochlorines. Consequently, the viscosity of the oil product can be used as a process control tool.

The present invention will now be described, by way of example only, with reference to one embodiment thereof and the accompanying drawing, in which:

FIG. 1 is a schematic diagram of the apparatus of one embodiment of the present invention for the conversion of organic sludges.

In FIG. 1 there is shown an apparatus 10 for the conversion of sludges. The apparatus 10 comprises a feed system 12 for dried sludge 14. The feed system 12 feeding said sludge 14 to a first reactor 16. The feed system 12 is such that it ensures both no air ingress into and no gaseous egress from the first reactor 16.

The first reactor 16 is provided with heating means, for example elements 18 thereabout such that dried sludge may be heated therein in the absence of oxygen to at least 250° C. Such results in the volatilisation of oil producing organic materials in the first reactor 16. Further, this reaction provides gaseous products and sludge residue or char. A screw conveyor 17 and motor 19 is provided to move the sludge through the first reactor 16.

The gaseous products from the first reactor 16 are transferred to the condenser 20 and oil/water separator if the condensation temperature is <100° C. The resulting oil 22 and/or non-condensable gaseous product is injected into a second reactor 24 together with non-condensable products 26 if a direct condenser is utilised. Sludge residue or char from the first reactor 16 is transferred to the second reactor 24 by way of a transfer line 26. The transfer line 26 is equipped with a valve system 28 to ensure that no gaseous products bypass the condensation system.

In the second reactor 24, provided with a heating means 30, the heated sludge residue from the first reactor 16 is contacted with the revaporised oil or oil and non-condensable gaseous products from the condenser 20 in the absence of oxygen at a maximum temperature of 550° C. Such allows reductive, heterogenic, catalytic gas/solid phase reactions for the generation of clean products and high quality oil product. A conveyor 29 and motor 31 is provided to move the solid products or char through the second reactor 24.

Gaseous products are subsequently removed from the second reactor 24, either for passage through a further condenser 32 and oil/water separation system or for alternative uses 33. This first option provides a volume of non-condensable gaseous product 34 and a volume of refined, low viscosity oil product 36. Solid products or char 38 are removed from the second reactor 24 by way of a further transfer line 40 having provided therein a screw conveyor 42 for ensuring both no air ingress into and no gaseous product egress from the second reactor 24. The screw conveyor 42 is connected to a cooling system 44 to cool the solid products or char to less than 200° C.

The present invention may be further described with reference to the following example:

The sewage sludges employed in the determination of process data using the continuous apparatus of the present invention were raw sludge containing a mixture of raw primary and waste activated sludge and digested sludge. The sludges were dried to approximately 95% dryness in a drying oven at 70° C. prior to processing in the reactor system. The oil quality data with regard to elemental analysis, gross calorific value, viscosity and density is summarised in Table 1.

Digested Sludge

Run 1: Conversion of the mixed digested sludge without vapour condensation after the first reactor;

Run 2: As per Run 1 with vapour condensation at 40° C. after the first reactor and injection of the oil product into the second reactor;

Run 3: As per Run 2, plus injection of non-condensable products into the second reactor.

Raw Sludge

Run 4: As per Run 1;

Run 5: As per Run 2.

The oil quality data for the five runs are shown in Table 1.

TABLE 1

Oil Quality Data, Runs 1–5

| Oil | | Digested Sludge | | | Raw Sludge | |
|---|---|---|---|---|---|---|
| Characteristics | Unit | Run 1 | Run 2 | Run 3 | Run 4 | Run 5 |
| Carbon Content | % | 64.6 | 70.3 | 72.1 | 57.8 | 62.4 |
| Hydrogen Content | % | 10.41 | 10.63 | 10.82 | 10.5 | 10.7 |
| Nitrogen Content | % | 6.48 | 6.36 | 6.44 | 6.72 | 6.31 |
| Sulphur Content | % | 0.78 | 0.76 | 0.82 | 0.52 | 0.44 |
| Oxygen Content (by difference) | % | 17.8 | 12.0 | 9.8 | 29.5 | 20.1 |
| Gross Calorific Value | MJ/kg | 31.78 | 34.69 | 35.76 | 28.6 | 30.7 |
| Viscosity (at 40° C.) | cSt | 39.6 | 17.2 | 11.9 | 43.4 | 29.6 |
| Density | g/ml | 0.996 | 0.963 | 0.952 | 0.998 | 0.975 |

A further series of tests were conducted to determine the influence of gas residence time (GRT), reaction temperature and temperature of intermediate condensation on oil quality as shown in Table 2. The sludge used for this test programme was a 50/50 mixture of raw primary and thickened waste activated sludge. The results of this test programme are summarised in Table 3 and confirm the findings of Table 1.

TABLE 2

PDU Test Programme

| Run Number | Reaction Temperature [°C.] | Feedrate [g/hr] | GRT [nominal] | Intermediate Condensation Temperature (°C.) |
|---|---|---|---|---|
| 19 | 400 | 600 | 1 | 40 |
| 20 | 400 | 450 | 1.5 | 40 |
| 21 | 400 | 300 | 2 | 40 |
| 22 | 450 | 600 | 1 | 40 |
| 23 | 450 | 450 | 1.5 | 40 |
| 24 | 450 | 300 | 2 | 40 |
| 25 | 450 | 600 | 1 | 110 |

TABLE 3

Oil Quality Data

| Oil Characteristics | Run 19 | Run 20 | Run 21 | Run 22 | Run 23 | Run 24 | Run 25 |
|---|---|---|---|---|---|---|---|
| Water Content [%] | 19.6 | 21.5 | 18.0 | 15.5 | 15.1 | 9.1 | 6.5 |
| GCV [MJ/kg] | 29.19 | 28.24 | 29.8 | 31.37 | 31.32 | 34.09 | 35.06 |
| Viscosity @ 20° C. | 102.6 | 74.4 | 80.9 | 59.0 | 55.6 | 34.8 | 73.5 |
| Viscosity @ 40° C. | 40.0 | 31.9 | 33.0 | 23.7 | 22.4 | 14.9 | 24.7 |
| Viscosity @ 100° C. | 6.8 | 6.2 | 6.0 | 4.3 | 4.1 | 3.0 | 3.7 |
| Viscosity Index | 128 | 149 | 130 | 81 | 70 | 18 | negative |
| Carbon Residue [%] | — | 0.88 | 1.01 | 1.31 | 1.18 | 1.11 | 1.60 |
| Carbon [%] | 59.38 | 57.54 | 60.56 | 63.84 | 64.46 | 70.14 | 71.77 |
| Hydrogen [%] | 10.54 | 10.56 | 10.50 | 10.34 | 10.85 | 10.59 | 10.58 |
| Nitrogen [%] | 5.49 | 5.34 | 5.46 | 5.65 | 5.94 | 6.07 | 6.95 |
| Sulphur [%] | 0.32 | 0.36 | 0.37 | 0.35 | 0.37 | 0.44 | 0.27 |
| Aromatic Hydrogen [%] | 3.5 | 4.8 | 7.5 | 7.3 | 8.3 | 6.9 | 4.1 |

The results in Tables 1 and 3 clearly show the benefit of intermediate oil condensation between reactors 16 and 24. Due to the significant reduction in water fed to reactor 24 the oil vapour Gas Retention Time (GRT) is greatly increased providing the necessary time for the conversion reactors to take place. Furthermore, by comparing Runs 22 and 25 it can be seen that increasing the intermediate condensation from 40° C to 110° C., a further improvement in oil quality is realised. This improvement is due to the fact that at a condensation temperature of 110° C. no water remains in the oil whereas at a condensation temperature of 40° C. followed by oil/water separation significant amounts of water remain in the oil.

The products for the determination of toxicity data were generated with a 1 tpd pilot plant. Since this pilot plant is a single stage reactor as shown in FIG. 1 of U.S. Pat. No. 4,618,735 the runs to exemplify the present invention were conducted in the following manner:

Run 6: Mixed sewage sludge was converted with the pilot plant, oil and char product were collected and stored;

Run 7: Char of Run 6 was fed into the reactor with the oil of Run 6 being injected into the second half of the reactor. Char and oil were fed into the reactor at the rate they were generated during Run 6.

The observed dioxin toxicity equivalents (TEQs) and the destruction and removal efficiencies (DRE's) calculated therefrom for these runs are summarised in Table 4 with oil quality data being shown in Table 5.

TABLE 4

TEQs and DRE's of Run 6 and 7

| | Feed | Run 6 | Run 7 |
|---|---|---|---|
| Sludge TEQ (ng) | 7.2 | 0 | 0 |
| Oil TEQ (ng) | — | 6.96 | 1.589 |
| Char TEQ (ng) | — | 0 | 0 |
| Total (ng) | 7.2 | 6.96 | 1.589 |
| TEQ DRE (%) | — | 3.33 | 77.9 |

TABLE 5

Oil Quality Data for Run 6 and 7

| Oil Quality | Unit | Run 6 | Run 7 |
|---|---|---|---|
| Gross Calorific Value | MJ/kg | 34.65 | 34.69 |
| Viscosity (at 70° C.) | cSt | 224.4 | 35.33 |
| Density | g/ml | 1.0282 | 0.9622 |

The sludge residue (char) from reactor 24 can be used as a fuel for drying the sludge in an integrated sludge conversion facility and may further be used as an absorbent. Furthermore, the char can be activated to produce a product with exceptional adsorption properties for heavy metals, as described in the paper "Environmentally Sound Disposal of Tannery Sludge" by S Skrypski-Mantele and T R Bridle, published in Water Science and Technology, Vol. 29, No. 4, pp 1033 to 1039, 1995.

The process for the conversion of sludges of the present invention may be optimised with regard to destruction of organochlorines through use of the viscosity of the oil product as a process indicator. It is apparent that the oil viscosity is significantly influenced by polar groups such as —COOH, —NH$_2$, —SH for example. Such groups are removed in the second reactor 24 by means of heterogeneous, reductive, thermal, catalytic, solid/gas phase reactions such as decarboxylation, desulphurisation, deamination, for example, resulting in a low viscosity oil. The reactions occurring in the second reactor 24 are catalysed by heavy metals including nickel, copper and both aluminium oxides and silicates. Nickel, copper and aluminium oxides and silicates are abundant in sewage sludges. In addition, the same conditions that favour such reactions facilitate the catalytic, reductive dehalogination of organochlorine compounds according to the Deacon process.

Accordingly, the viscosity of the oil product 36 has been determined to be inversely proportional to the destruction rate of organochlorine compounds present in the sludge. As a consequence, the lower the viscosity of the oil product, the greater the destruction rate of organochlorine compounds and consequently the viscosity of the oil product can be used as a process control tool. Such is particularly relevant in light of the desirability of the production of clean fuels with unrestricted uses in conventional diesel generators, engines or turbines.

The process and apparatus of the present invention provide reductive, thermal heterogenic solid/gas phase reactions in order to obtain storable products with unrestricted use. Modifications and variations such as would be apparent to the skilled addressee are considered to fall within the scope of the present invention.

We claim:

1. An apparatus for the conversion of organic sludges, the apparatus comprising a feed system for dried sludge to be conveyed, a first reactor, a second reactor, a condenser system and an oil/water separation system, the first reactor having a transfer line provided for transfer of gaseous product to the condenser system and/or oil/water separation system, the condenser system and/or oil/water separation system having a transfer line provided for reinjection of oil or oil and non-condensable products into the second reactor, the second reactor being adapted to contact the heated sludge residue from the first reactor with the oil or oil and non-condensable products of the condenser system and/or oil/water separation system, wherein gaseous products may be removed from the second reactor.

2. An apparatus according to claim 1, wherein a transfer line is provided such that gaseous products removed from the second reactor are transferred to a further condenser system and oil/water separation system.

3. An apparatus according to claim 1, wherein the transfer line between the first reactor and second reactor has provided therein a valve system that acts to prevent gaseous products passing therethrough.

4. An apparatus according to claim 1, wherein a further transfer line is provided from the second reactor allowing solid product to be removed therefrom.

5. An apparatus according to claim 4, wherein the further transfer line has provided therein a screw conveyor that acts to prevent air ingress into, and gaseous product escape, from the second reactor.

* * * * *

UNITED STATES PATENT AND TRADEMARK OFFICE
CERTIFICATE OF CORRECTION

PATENT NO. : 5,865,956
DATED : February 2, 1999
INVENTOR(S) : Trevor Redvers Bridle and Stefan Skrypski-Mantele It is certified that error appears in the above-identified patent and that said Letters Patent is hereby corrected as shown below:

On title page, insert --Related U.S. Application Data
[62] Divisional of Ser. No. 08/828,341 filed Mar. 28, 1997, now Pat. No. 5,847,248--

Signed and Sealed this

Seventeenth Day of August, 1999

Attest:

Q. TODD DICKINSON

*Attesting Officer*     *Acting Commissioner of Patents and Trademarks*